(12) United States Patent
Weinberg

(10) Patent No.: US 7,743,735 B2
(45) Date of Patent: Jun. 29, 2010

(54) ANIMAL LEASH

(75) Inventor: Alan Weinberg, Great Neck, NY (US)

(73) Assignee: Rhode Island Textile Company, Pawtucket, RI (US)

( * ) Notice: Subject to any disclaimer, the term of this patent is extended or adjusted under 35 U.S.C. 154(b) by 85 days.

(21) Appl. No.: 12/029,247

(22) Filed: Feb. 11, 2008

(65) Prior Publication Data
US 2009/0199787 A1    Aug. 13, 2009

(51) Int. Cl.
*A01K 27/00* (2006.01)
(52) U.S. Cl. .................................................. 119/795
(58) Field of Classification Search .............. 119/797, 119/769, 774, 791, 792, 793, 795, 796, 798, 119/801
See application file for complete search history.

(56) References Cited

U.S. PATENT DOCUMENTS

| | | | | |
|---|---|---|---|---|
| 3,332,398 | A | * | 7/1967 | Mintz .......................... 119/797 |
| 4,667,624 | A | * | 5/1987 | Smith .......................... 119/770 |
| 4,763,609 | A | | 8/1988 | Kulik |
| D297,673 | S | * | 9/1988 | Shapero ................... D29/101.1 |
| 5,038,719 | A | * | 8/1991 | McDonough ............... 119/772 |
| D350,628 | S | | 9/1994 | Williams |
| 5,351,654 | A | * | 10/1994 | Fuentes ...................... 119/770 |
| 5,363,810 | A | | 11/1994 | Kraus |
| 5,649,504 | A | | 7/1997 | Culp |
| 5,666,909 | A | * | 9/1997 | Dupre ......................... 119/797 |
| D388,558 | S | | 12/1997 | Miller |
| 5,749,326 | A | | 5/1998 | Jones et al. |
| D417,317 | S | | 11/1999 | Greer |
| D454,235 | S | | 3/2002 | Kaplan |
| 6,453,851 | B1 | | 9/2002 | Holt, Jr. et al. |
| 6,467,437 | B2 | * | 10/2002 | Donovan et al. ............ 119/798 |
| 6,532,903 | B2 | | 3/2003 | Prusia et al. |
| 6,827,045 | B1 | | 12/2004 | Wilner et al. |
| 6,834,621 | B1 | | 12/2004 | O'Neill |
| 6,851,393 | B2 | | 2/2005 | Bremm |
| 6,971,334 | B1 | * | 12/2005 | Livesay et al. .............. 119/798 |
| 6,990,929 | B2 | | 1/2006 | Young, III |
| 7,096,827 | B2 | | 8/2006 | Sporn |
| 7,188,585 | B1 | | 3/2007 | Carter |
| D545,670 | S | | 7/2007 | Ostenrieder et al. |
| 7,293,531 | B2 | | 11/2007 | Young, III |
| 7,418,926 | B2 | * | 9/2008 | Kung .......................... 119/798 |
| 2002/0023595 | A1 | * | 2/2002 | Kaufman ..................... 119/797 |
| 2006/0027189 | A1 | | 2/2006 | Luber |
| 2006/0032461 | A1 | * | 2/2006 | Sporn .......................... 119/797 |

* cited by examiner

*Primary Examiner*—Rob Swiatek
*Assistant Examiner*—Ebony Evans

(57) ABSTRACT

A leash according including an elongated lead having a proximal end portion and a distal end portion, a first handle disposed at the proximal end portion, a collar attachment mechanism disposed at the distal end portion, and a second handle disposed intermediate the proximal and distal end portions, the second handle being adjustable in position along the elongated lead and adjustable in size.

8 Claims, 2 Drawing Sheets

ANIMAL LEASH

FIELD OF THE INVENTION

The present invention generally relates to leashes for animals, and in particular to leashes having adjustable and movable handles.

BACKGROUND OF THE INVENTION

A leash for restraining or tethering an animal such as a dog typically includes an elongated lead having a handle at one end and a clasp at the other end for attachment to the animal's collar. The handle allows the user some control of the animal while walking or standing.

Some leashes may also have second handles, which allow the user to have even more control of the animal. This is particularly useful in the case of relatively larger or stronger animals. However, even when using a leash with a second handle, the user's size and leverage relative to a larger and stronger animal may limit the ability of the user to control the animal. For example, a user may desire to keep a larger animal on a relatively short leash to have better control, which would require the user to wrap the excess leash portion around his/her hand so that the leash handles can be held closer to the user's body. However, the process of wrapping the leash is not particularly effective, especially when a user needs to cease immediate control of an animal that has suddenly began acting unruly. Wrapping the leash around the user's hand may also result in an injury if the animal pulls on the leash. Further, a user's hand may slip out of the leash handles if the handles are too large for the user. Similarly, if the leash handle is too small, the handle may not fit a user with a large hand.

Accordingly, there is a need for a leash that allows a user to control an animal without being limited by the size and location of the handles on the leash.

SUMMARY OF THE INVENTION

A leash according to an exemplary embodiment of the present invention comprises: an elongated lead having a proximal end portion and a distal end portion; a first handle disposed at the proximal end portion; a collar attachment mechanism disposed at the distal end portion; and a second handle disposed intermediate the proximal and distal end portions, the second handle being adjustable in position along the elongated lead and adjustable in size.

In at least one embodiment, the second handle comprises an elongated strap having a first end and a second end.

In at least one embodiment, the first and second ends of the elongated strap are adjustable in position along the lead so that the second handle is adjustable in position and size.

In at least one embodiment, the leash further comprises a first handle attachment mechanism that adjustably attaches the first end of the elongated strap to the lead and a second handle attachment mechanism that adjustably attaches the elongated strap of the second handle to the lead.

In at least one embodiment, each of the first and second handle attachment mechanisms comprise a plurality of web portions that define first and second openings, the first end of the elongated strap being attached to at least one of the web portions of the first handle attachment mechanism, the second end of the elongated strap being attached to at least one of the web portions of the second handle portion, and, within each of the first and second handle attachment mechanisms, the lead is threaded through the first and second openings over at least one of the web portions disposed between the first and second openings.

In at least one embodiment, the leash attachment mechanism is a clasp having an open configuration and a closed configuration.

In at least one embodiment, the clasp is biased towards the closed configuration.

In at least one embodiment, the leash comprises a material selected from the following types of materials: cotton, polyester, polypropylene and leather.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAIL DESCRIPTION OF THE PREFERRED EMBODIMENT(S)

The present invention is directed to an animal leash, such as a leash for a pet dog, that includes a second handle for better control of the animal. The second handle is preferably adjustable in size to fit a variety of hand sizes. Further, the second handle is preferably adjustable in position along the leash lead so that the leash can be adjusted to accommodate a user's arm length, or to change a user's leverage over an animal on the leash.

Figure 1:
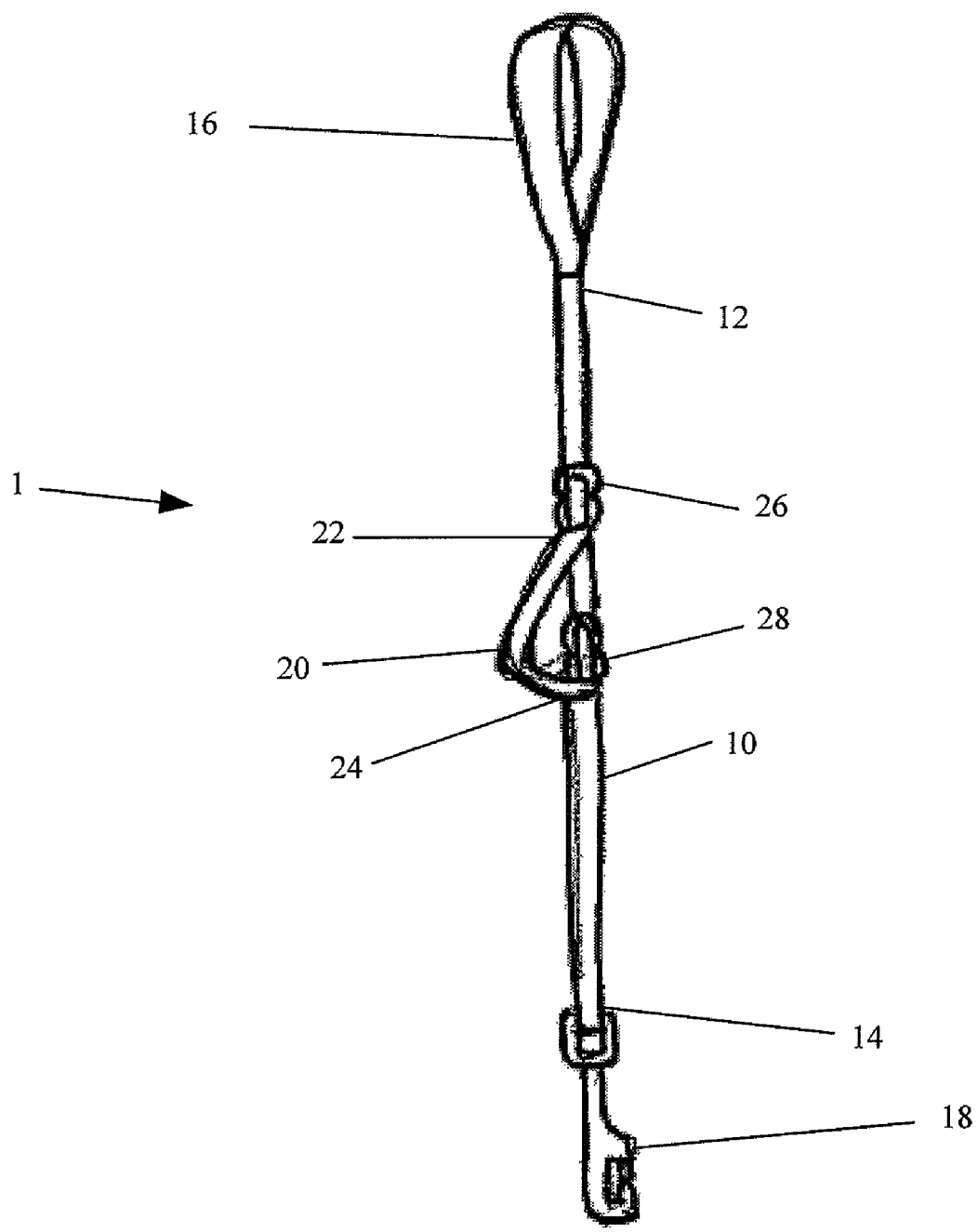
FIG. 1 is a perspective view of a leash according to an exemplary embodiment of the present invention.

FIG. 1 is a perspective view of a leash, generally designated by reference number 1, according to an exemplary embodiment of the present invention. The leash 1 includes an elongated lead 10 having a proximal end portion 12 and a distal end portion 14. A first handle 16 is disposed at the proximal end portion 12 of the lead 10. The first handle 16 may be formed by looping the proximal end of the lead 10 back onto the lead 10 and sewing or otherwise attaching the proximal end to the lead 10. Thus, the first handle 16 is in the form of a loop, through which a user's hand may be inserted for better control of the leash 1.

A collar attachment mechanism 18 is disposed at the distal end portion 14 of the leash 1. As shown in FIG. 1, the collar attachment mechanism 18 may include a clasp that is biased in the closed position so that the clasp is able to retain a collar after the clasp is forcibly opened and inserted into a corresponding hook on the collar (not shown). Any other suitable collar attachment mechanism may be employed, or, alternatively, the leash 1 may include a permanently attached collar at the distal end portion 14.

The leash 1 also includes a second handle 20 disposed between the proximal end portion 12 and the distal end portion 14 of the leash 1. The second handle 20 may be in the form of an elongated strap having a first end 22 and a second end 24. The second handle 20 is preferably adjustable in position along the leash 1, as well as being adjustable in size. In this regard, the first end 22 of the second handle 20 may be attached to the lead 10 by a first handle attachment mechanism 26, and the second end 24 of the second handle 20 may be attached to the lead 10 by a second handle attachment mechanism 28.

Figure 2:
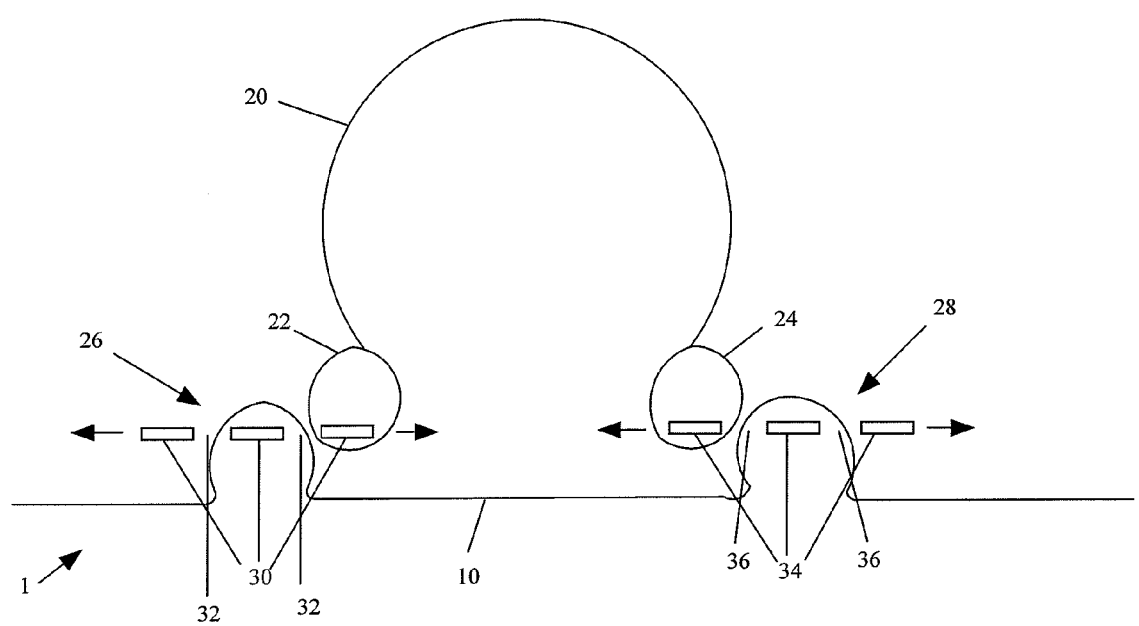
FIG. 2 is a partial cross-sectional view of the leash of FIG. 1.

As shown in the cross-sectional view of FIG. 2, the first and second handle attachment mechanisms 26, 28 may include respective web portions 30, 34 that define corresponding openings 32, 36. The first end 22 of the second handle 20 is attached to one of the web portions 32 of the first handle attachment mechanism 26, and the second end 24 of the second handle 20 is attached to one of the web portions 36 of the second handle attachment mechanism 28. Further, the lead 10 is threaded through the openings 32, 36 formed in the first and second handle attachment mechanisms 26, 28. Thus, the first and second handle attachment mechanisms 26, 28 are held in place by the frictional contact between the lead 10 and the web portions 32, 36 during use of the leash 1. As shown by the arrows in FIG. 2, a user may adjust the location of the second handle 20 along the lead 10, as well as the size of the second handle 20, by moving the first and second handle attachment mechanisms 26, 28 along the lead 10 as desired after exerting enough force to the first and second handle attachment mechanisms 26, 28 to overcome the frictional contact with the web portions 32, 36.

In various exemplary embodiments of the present invention, the components of the leash 1, including the lead 10 and the first and second handles 16 and 20, may be made of any suitable material, such as, for example, cotton, polyester, polypropylene, leather or combinations thereof. Further, the components may be made of the same materials or different materials.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A leash comprising:
    an elongated lead having a proximal end portion and a distal end portion and a length defined therebetween;
    a first handle disposed at the proximal end portion and constructed and arranged to receive a user's hand;
    a collar attachment mechanism disposed at the distal end portion;
    a second handle disposed intermediate the proximal and distal end portions, the second handle being adjustable in a direction toward the proximal end portion of the elongated lead to decrease the distance between the first handle and the second handle, the second handle being further adjustable in a direction toward the distal end portion of the elongated lead to increase the distance between the first handle and the second handle and the second handle also being adjustable in size; and
    wherein the length of the elongated lead remains constant and does not change as the position of the second handle is adjusted in either the direction toward the proximal end portion of the elongated lead or in the direction toward the distal end portion of the elongated lead and wherein adjustment of the second handle allows a user to provide leverage over an animal during use of the leash.

2. The leash of claim 1, wherein the second handle comprises an elongated strap having a first end and a second end.

3. The leash of claim 2, wherein the first and second ends of the elongated strap are adjustable in position along the length of the lead so that the second handle is adjustable in position and size.

4. The leash of claim 3, further comprising a first handle attachment mechanism that adjustably attaches the first end of the elongated strap to the lead and a second handle attachment mechanism that adjustably attaches the second end of the elongated strap to the lead.

5. The leash of claim 4, wherein each of the first and second handle attachment mechanisms comprise a plurality of web portions that define first and second openings, the first end of the elongated strap being attached to at least one of the web portions of the first handle attachment mechanism, the second end of the elongated strap being attached to at least one of the web portions of the second handle portion, and, within each of the first and second handle attachment mechanisms, the lead is threaded through the first and second openings over at least one of the web portions disposed between the first and second openings.

6. The leash of claim 1, wherein the collar attachment mechanism is a clasp having an open configuration and a closed configuration.

7. The leash of claim 6, wherein the clasp is biased towards the closed configuration.

8. The leash of claim 1, wherein the leash comprises a material selected from the following types of materials: cotton, polyester, polypropylene and leather.

* * * * *